(12) United States Patent
Nagl

(10) Patent No.: US 6,315,943 B1
(45) Date of Patent: Nov. 13, 2001

(54) APPARATUS FOR PRODUCING MOLTEN METAL

(75) Inventor: Michael Nagl, Reichenau (AT)

(73) Assignees: Voest-Alpine Industrieanlagenbau GmbH, Linz (AT); Pohang Iron & Steel Co., Ltd.; Research Institute of Industrial Science & Technology, Incorporated Foundation, both of (KR)

( * ) Notice: Subject to any disclaimer, the term of this patent is extended or adjusted under 35 U.S.C. 154(b) by 0 days.

(21) Appl. No.: 09/333,433

(22) Filed: Jun. 15, 1999

Related U.S. Application Data

(63) Continuation of application No. PCT/AT97/00277, filed on Dec. 16, 1997.

(30) Foreign Application Priority Data

Dec. 17, 1996 (AT) ................................................... 2205/96

(51) Int. Cl.$^7$ ................................................. C21B 13/00
(52) U.S. Cl. ........................................ 266/144; 266/182
(58) Field of Search ................................. 266/160, 144, 266/182

(56) References Cited

U.S. PATENT DOCUMENTS

| | | | |
|---|---|---|---|
| 2,418,394 | 4/1947 | Brown | 75/26 |
| 4,493,732 | 1/1985 | Melcher et al. | 75/24 |
| 4,699,655 | * 10/1987 | Milionis | 266/160 |
| 5,948,139 | * 9/1999 | Kepplinger et al. | 266/182 |

FOREIGN PATENT DOCUMENTS

| | | |
|---|---|---|
| 0010627 | 5/1980 | (EP) . |
| 0111176 | 6/1984 | (EP) . |
| 0174291 | 3/1986 | (EP) . |
| 0217331 | 4/1987 | (EP) . |
| 0576414 | 12/1993 | (EP) . |
| 0594557 | 4/1994 | (EP) . |
| 882909 | 11/1961 | (GB) . |
| 2085480 | 4/1982 | (GB) . |

* cited by examiner

*Primary Examiner*—Melvyn Andrews
(74) *Attorney, Agent, or Firm*—Ostrolenk, Faber, Gerb & Soffen, LLP

(57) ABSTRACT

In a method of producing molten metal (8) from at least partially fine-particulate metal carriers in a melter gasifier (2) in which under supply of carbon-containing material and oxygen or an oxygen-containing gas under simultaneous formation of a reducing gas in a bed (11) formed of solid carbon carriers (4) the metal carriers are melted, the supplied fine-particulate metal carriers in order to avoid discharging thereof are charged to a high-temperature combustion zone (13) maintained by a combustion process and there are melted at least for the most part or completely, wherein the high-temperature combustion zone (13) is spatially isolated from the freeboard (12) of the melter gasifier (2) located above the bed (11) and extends into the bed (11), wherein the offgases formed in the high-temperature combustion zone (13) exit the same passing through at least a portion of the bed (11) and wherein furthermore the offgases are cooled in the bed (11) and are withdrawn from the melter gasifier (2) along with the reducing gas formed within the bed (11).

10 Claims, 1 Drawing Sheet

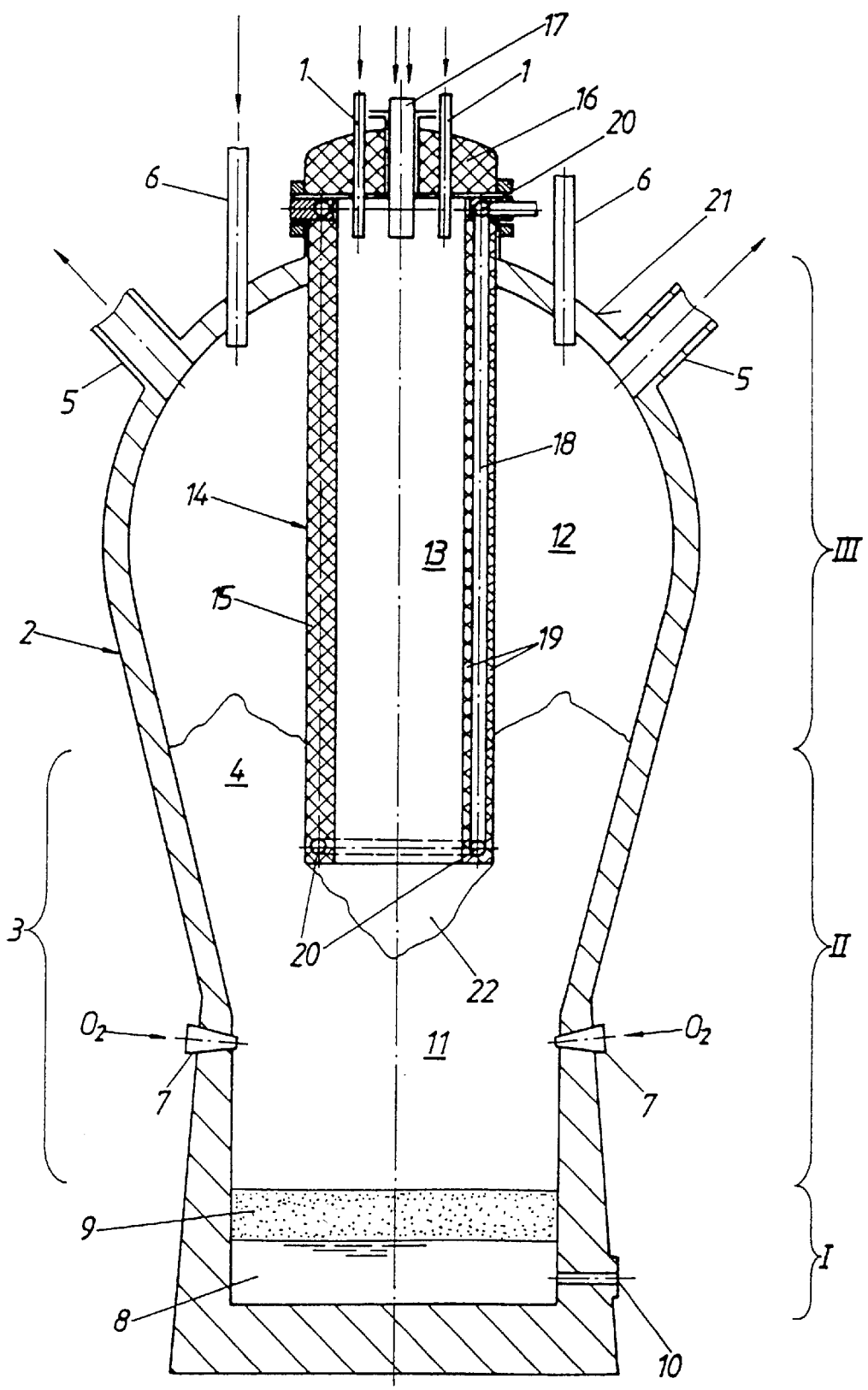

APPARATUS FOR PRODUCING MOLTEN METAL

CROSS-REFERENCE TO RELATED APPLICATIONS

This is a continuation application of International Application PCT/AT97/00277, with an International filing date of Dec. 16, 1997.

The invention relates to a method of producing molten metal, in particular pig iron or steel pre-products, from at least partially fine-particulate metal carriers, in particular partially reduced or reduced sponge iron, in a melter gasifier in which under supply of carbon-containing material and oxygen or an oxygen-containing gas under simultaneous formation of a reducing gas in a bed formed of solid carbon carriers the metal carriers are melted, optionally upon previous complete reduction, as well as to a melter gasifier for carrying out the method.

From EP-B-0 010 627 it is known to feed in particulate iron-containing material, such as pre-reduced sponge iron, through a centrally arranged charging opening in the hood of the melter gasifier from above, with the particles dropping into the melter gasifier by the effect of gravity and being slowed down in the fluidized bed existing within the melter gasifier. Coal in lumpy form is charged through a charging opening arranged laterally in the hood of the melter gasifier or in the dome terminating the melter gasifier toward the top, also under the influence of gravity. The reducing gas formed in the melter gasifier is withdrawn through the centrally arranged charging opening for the iron-containing material.

A process of this kind is not suitable for processing fine-particle metal carriers, in particular fine-particle sponge iron, since the fine-particle metal carriers due to the pronounced gas flow of the reducing gas formed in the gasification zone and withdrawn through the central charging opening arranged in the hood or in the dome of the melter gasifier would be instantly carried out of the melter gasifier. Such a discharge of the fine-particle metal carriers is further favored by the temperature reigning in the upper region of the melter gasifier, i.e. in the region above the gasification zone, which is too low to ensure a melt-down, i.e. agglomeration of the fine particles at the charging site to form bigger particles which in spite of the ascending gas stream could sink down into the gasification zone.

From EP-A-0 217 331 it is known to introduce pre-reduced fine ore into a melter gasifier and to completely reduce and melt it by means of a plasma burner while supplying a carbon-containing reducing agent. The pre-reduced fine ore or the sponge-iron powder respectively is fed to a plasma burner provided in the lower section of the melter gasifier. A disadvantage of this method is that by supplying the pre-reduced fine ore directly in the lower meltdown region, i.e. in the region where the melt collects, complete reduction can no longer be ensured and the chemical composition necessary for further processing the pig iron cannot be achieved by any means. Moreover, the charging of major amounts of pre-reduced fine ore is not feasible due to fluidized bed or the fixed bed forming from coal in the lower region of the melter gasifier, as it is not possible to carry off a sufficient quantity of the melting products from the high-temperature zone of the plasma burner. The charging of major amounts of pre-reduced fine ore would lead to instant thermal and mechanical failure of the plasma burner.

From EP-B-0 11 1 176 it is known to feed a fine grain fraction of sponge iron particles into the melter gasifier through a downpipe projecting from the head of the melter gasifier into the proximity of the coal fluidized bed. At the end of the downpipe a baffle plate is provided for minimizing the velocity of the fine grain fraction, resulting in a very low exit velocity of the fine grain fraction from the downpipe. At the charging site, the temperature reigning in the melter gasifier is very low, whereby immediate melting of the supplied fine grain fraction is prevented. This and the low exit velocity from the downpipe cause a substantial portion of the supplied fine grain fraction to be carried out of the melter gasifier again together with the reducing gas generated in the same. The charging of a major amount of sponge iron particles containing a fine portion or of only a fine grain fraction is not feasible in accordance with this method.

From EP-A-0 594 557 it is known to charge a fine grain fraction of sponge iron by means of a conveying gas directly into the fluidized bed formed by the gasification zone in the melter gasifier. However, this is disadvantageous, since hereby the gas circulation of the fluidized bed may be disturbed because obstructions of the fluidized bed, which acts like a filter, may ensue as a consequence of the fine grain fraction that is blown directly into the fluidized bed. As a result, eruptive outbreaks of gas may occur which will break up the clogged fluidized bed. Hereby, the gasification process for the carbon carriers and also the melt-down process for the reduced iron ore are markedly disturbed.

From EP-A-0 576 414 it is known to feed fine-particle metal carriers into the gasification zone via dust burners. This method exhibits a poor melt-in performance, which is due to a short dwelling time of the particles in the hot flame.

The invention aims at avoiding these disadvantages and difficulties and has as its object to provide a method of the kind initially described as well as a melter gasifier for carrying out the method, allowing the processing of fine-particulate metal carriers without the need for briquetting and, in doing so, on the one hand to reliably avoid discharging of the supplied fine-particulate metal carriers, optionally in pre-reduced or in completely reduced condition, by the reducing gas produced in the melter gasifier, and on the other hand to ensure complete reduction, which may optionally be required, of the fine particles. It is a particular object of the invention to provide a method enabling the processing of a charge the greatest part, preferably 100%, of which is/are made up of fine-particulate iron-containing material to pig iron and/or steel prematerial utilizing a melter gasifier.

With a method of the initially described kind, this object is achieved in that the fine-particulate metal carriers are charged to a high-temperature combustion zone maintained by a combustion process and there, optionally upon complete reduction, are melted at least for the most part or completely, wherein the high-temperature combustion zone is spatially isolated from the freeboard of the melter gasifier located above the bed and extends into the bed, wherein the offgases formed in the high-temperature combustion zone exit the same passing through at least a portion of the bed and wherein furthermore the offgases are cooled in the bed and are withdrawn from the melter gasifier along with the reducing gas formed within the bed.

A melter gasifier for carrying out the method, having feed ducts for oxygen-containing gases, carbon carriers and metal carriers running into it and having at least one gas discharge duct for a reducing gas produced in a bed of the melter gasifier formed of solid carbon carriers departing from it, and with a tap for the metal melt and for slag is characterized in that at least one feed duct for feeding fine-particulate metal carriers opens into at least one high-temperature combustion chamber that is spatially isolated from the interior of the melter gasifier and, by a mouth, in turn projects into the bed formed of solid carbon carriers and is provided with a burner.

To assure easy access to the high-temperature combustion chamber as well as a long service life of the same, the high-temperature combustion chamber is advantageously constructed as a wall that departs from the dome of the melter gasifier, is open at the bottom, cylindrical in shape and provided with a refractory material.

A simple construction is characterized in that only a single high-temperature combustion chamber is provided which is arranged centrally and with its longitudinal axis lying in the vertical longitudinal axis of the melter gasifier.

Advantageously, the high-temperature combustion chamber by its upper end projects outward through the dome of the melter gasifier and at this exterior end the feed duct for fine-particulate metal carriers runs into the high-temperature combustion chamber, and furthermore the burner is arranged centrally at this outer end, whereby repair work to be done on the burner or exchange of the same is feasible in an easy manner.

An ideal structure of the bed is attainable if according to a preferred embodiment feed ducts for carbon carriers project into the melter gasifier at a radial distance from the high-temperature combustion chamber, into the dome of the melter gasifier.

The service life can be further increased if the wall of the high-temperature combustion chamber is provided with an internal wall cooling, wherein advantageously the wall of the high-temperature combustion chamber is equipped with finned tubes which are flown through by a cooling medium and are provided with a refractory lining on both sides, and, further, at the upper end and at the lower end of the high-temperature combustion chamber there are suitably provided ring-shaped headers for a cooling medium, preferably cooling water, each being integrated into the wall of the high-temperature combustion chamber.

At its end projecting outward through the dome of the melter gasifier, the high-temperature combustion chamber suitably is provided with a removable cover and the burner and the feed duct are arranged in the cover.

It is beneficial to the process course if the burner is formed by a fine-coal/oxygen burner.

In the following, the invention is explained in more detail with reference to an exemplary embodiment represented in the drawing, wherein the Figure illustrates a melter gasifier in vertical longitudinal section in schematic representation.

Pre- or completely reduced fine ore—in case of iron-containing fine ore this will be sponge iron powder—is supplied to a melter gasifier 2 through at least one conveying duct 1 in a manner that will be described in more detail below. In the melter gasifier 2, a CO— and $H_2$—containing reducing gas is produced from coal 4 and oxygen-containing gas in a gasification zone 3 and is fed for example into a fluidized bed reactor (not illustrated) via a reducing-gas discharge duct 5. The reducing gas streams through this fluidized bed reactor in counterflow to the ore flow in order to reduce fine-particulate iron-oxide-containing material and is discharged from the fluidized bed reactor via a top-gas discharge duct, is subsequently cooled and scrubbed in a wet scrubber and then is available to consumers as a top gas.

The melter gasifier 2 is provided with supply ducts 6 for solid carbon carriers in lumpy form, supply ducts 7 for oxygen-containing gases as well as optionally supply ducts for carbon carriers, such as hydrocarbons, that are liquid or gaseous at room temperature as well as for burned fluxes.

In the melter gasifier 2, in a lower section I below the gasification zone 4, molten pig iron 8 or molten steel pre-material respectively and molten slag 9 collect, which are tapped off via a tap 10.

In a section 11 of the melter gasifier 2 arranged above the lower section I a bed 11 is formed from the solid carbon carriers, preferably a fixed bed and/or a fluidized bed. The upper section III provided above the central section II serves as a calming space 12 for the reducing gas forming in the melter gasifier 2 and for solid particles entrained by the reducing gas.

The pre- or completely reduced fine ore is charged into the gasification zone 3 via a high-temperature combustion zone 13 arranged vertically and centrally in the melter gasifier 2, into which zone there enters the conveying duct 1—by several branch ducts. The high-temperature combustion zone 13 is provided in a high-temperature combustion chamber 14 penetrating the dome of the melter gasifier 2 and projecting downward into the bed 11. It is constructed so as to be cylindrical and open at the bottom and is provided with a wall 15 designed to be refractory.

The high-temperature combustion chamber 14 is at its upper end provided with a removable cover 16 through which the conveying duct 1 with the branch ducts is conducted. Centrally in the cover 16, a burner 17, preferably a fine-coal/oxygen burner, is arranged whose flame jet is directed vertically downward.

The wall 15 of the high-temperature combustion chamber 14 is provided with an internal wall cooling formed by finned tubes 18 which are flown through by a cooling medium. On both sides of the finned tubes 18, a refractory lining 19 is arranged. At the upper end and at the lower end of the high-temperature combustion chamber 14, ring-shaped headers 20 for the cooling medium, preferably cooling water, are arranged, each being integrated into the wall 15 of the high-temperature combustion chamber 14.

The feed ducts 6 for the solid lumpy carbon carriers project through the dome 21 of the melter gasifier 2 at a radial distance outside of the high-temperature combustion chamber 14. As can be seen from the Figure, the bed 11 will form radially outside of the high-temperature combustion chamber 14, in a ring-like shape. Below the high-temperature combustion chamber 14 there will form a cavern 22 of roughly conical shape.

In the high-temperature zone 13 maintained by means of the burner 17, the sponge iron powder is melted for the major part, preferably entirely, and it enters the bed 11 or the combustion zone 3, respectively, in liquid condition. The melted sponge iron trickles downward through the coke network that forms the bed 11 and is carburized in the process. The hot offgases originating in the high-temperature combustion zone 13 enter the bed 11 from the cone-shaped zone that is free from piled-up material, i.e. the cone-shaped cavern 22, and together with the reducing gas formed in the gasification zone 3 flow upwards via the annular bed radially adjacent the combustion chamber 14 and are carried off via the reducing gas discharge ducts 4. In flowing through the bed 11, the offgases cool down to the desired offgas temperature of roughly 1000° C.

In accordance with the invention, melting thus takes place entirely or at least almost entirely above the bed 11, whereby the residence time of the sponge iron in the melter gasifier 2 is considerably increased. Furthermore, discharging of sponge iron powder from the melter gasifier 2 is no longer possible, since the sponge iron powder is supplied directly to the bed 11 in the downward direction, with the offgases formed in the high-temperature combustion zone 13. Here, melt droplets are filtered off from the offgases by means of the bed 11, so that the operation of the melter gasifier 2 is markedly enhanced as compared with the prior art.

The invention is not limited to the illustrated exemplary embodiment but may be modified in various respects. In particular, utilization for metals other than iron, especially copper (oxidic, sulfidic), tin, lead (metallic, oxidic or sulfidic), nickel and chromium—the last two in the form of ore—has to be considered. It is also feasible to charge a portion of the sponge iron to the bed 11 in lumpy form, f.i. as pellets, namely outside of the high-temperature combustion zone 13, the zone 3 thus having to be denoted not just as a gasification zone but also as a meltdown gasifying zone.

Utilization for oxidic charging substances, such as f.i. unreduced iron oxide or oxidic copper, tin, lead, is energetically feasible. In that case, a prereduction and a complete reduction would take place in the high-temperature zone, supply of oxygen and coal having to be increased.

What is claimed is:

1. Melter gasifier (2) for producing a metal melt (8) from at least partially reduced metal carriers containing a portion of fine-particulate metal carriers, and for producing a reducing gas by coal gasification, said melter gasifier (2) having a first section (I), a second section (II) and a third section (III);

said third section (III) having an upper portion in the form of a dome (21) and having feed ducts (1, 6,) for metal carriers and carbon carriers, and at least one gas discharge duct (5) for a reducing gas produced in a bed (11) of the melter gasifier (2);

said second section (II) adapted to contain a bed of solid carbon carriers and being provided with a feed duct for oxygen-containing gases (7); and said first section (I) having a tap (10) for the metal melt (8) and a tap for slag (9);

said melter gasifier further comprising at least one high-temperature combustion chamber (14) within the interior (12) of the melter gasifier (2), each said combustion chamber having an exit portion which extends into said second section (II) of the melter gasifier and being provided with at least one feed duct (1) for feeding fine-particulate metal carriers thereinto and with a burner (17) extending thereinto.

2. Melter gasifier according to claim 1, wherein the burner (17) is a fine-coal/oxygen burner.

3. Melter gasifier according to claim 2, wherein the high-temperature combustion chamber (14) is in the form of a cylinder having a refractory wall, said combustion chamber extending vertically from the top of said melter gasifier and being open at the bottom, and said burner being centrally positioned at the top of said combustion chamber.

4. Melter gasifier according to claim 3, wherein only a single high-temperature combustion chamber (14) is provided.

5. Melter gasifier according to claim 3, wherein the high-temperature combustion chamber (14) by its upper end projects exteriorly through the dome (21) of the melter gasifier (2) and that at this exterior end the feed duct (1) for fine-particulate metal carriers enters the high-temperature combustion chamber (14).

6. Melter gasifier according to claim 3, wherein the feed ducts (6) for carbon carriers project into the dome of the melter gasifier (2) at a distance apart from the high-temperature combustion chamber (14).

7. Melter gasifier according to claim 2, wherein the wall (15) of the high-temperature combustion chamber (14) is provided with internal wall cooling means.

8. Melter gasifier according to claim 7, wherein the wall (15) of the high-temperature combustion chamber (14) is provided with finned tubes (18) through which a cooling medium may flow and are provided with refractory linings.

9. Melter gasifier according to claim 8, wherein at the upper end and at the lower end of the high-temperature combustion chamber (14) there are provided ring-shaped headers (20) for a cooling medium, each header being integrated into the wall (15) of the high-temperature combustion chamber (14).

10. Melter gasifier according to claim 5, wherein at its end projecting through the dome (21) of the melter gasifier (2) the high-temperature combustion chamber (14) is provided with a removable cover (16) and that the burner (17) and the feed duct (1) are arranged in the cover (16).

* * * * *